US009868390B1

(12) United States Patent
Sam et al.

(10) Patent No.: US 9,868,390 B1
(45) Date of Patent: Jan. 16, 2018

(54) LED LIGHTING ASSEMBLY USING A DYNAMIC COLOR MIXING SCHEME

(71) Applicant: B/E AEROSPACE, INC., Wellington, FL (US)

(72) Inventors: Luis Sam, South Setauket, NY (US); Eric Johannessen, Holbrook, NY (US); Brendan Upton, East Patchogue, NY (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 15/338,930

(22) Filed: Oct. 31, 2016

(51) Int. Cl.
 *B60Q 3/02* (2006.01)
 *H05B 33/08* (2006.01)
 *B64D 11/00* (2006.01)
 *B64D 47/02* (2006.01)

(52) U.S. Cl.
 CPC ............ *B60Q 3/0259* (2013.01); *B64D 11/00* (2013.01); *B64D 47/02* (2013.01); *H05B 33/0845* (2013.01); *H05B 33/0863* (2013.01)

(58) Field of Classification Search
 CPC  H05B 37/02; H05B 33/0803; H05B 33/0815; H05B 33/086; H05B 33/0842; H05B 33/0845; H05B 33/0857; H05B 33/0863; H05B 33/0812; F21Y 2101/00; F21Y 2113/13; F21Y 2115/10; F21Y 2113/10; B64D 2011/0038; B64D 2203/00; Y02B 20/48; F21K 9/00; F21S 10/00; F21S 10/02
 USPC .............. 315/82, 294, 297, 307, 312, 185 S; 362/230, 231, 249.02, 227, 362
 See application file for complete search history.

(56) References Cited

U.S. PATENT DOCUMENTS

| 6,340,868 | B1 * | 1/2002 | Lys ...................... A61N 5/0616 315/185 S |
| 7,352,339 | B2 * | 4/2008 | Morgan .................. F24C 7/004 340/815.68 |
| 7,497,590 | B2 * | 3/2009 | Rains, Jr. .................. F21S 2/00 250/228 |
| 7,821,194 | B2 * | 10/2010 | Negley ..................... F21K 9/00 313/498 |
| 8,240,875 | B2 * | 8/2012 | Roberts ................... F21V 5/002 362/217.05 |
| 8,378,595 | B2 * | 2/2013 | Eckel ................. H05B 37/0254 315/291 |
| 8,564,205 | B2 * | 10/2013 | Roberts ................ B60Q 1/0011 315/294 |
| 8,669,722 | B2 * | 3/2014 | Yeh ..................... H05B 33/0824 315/152 |
| 9,018,858 | B2 * | 4/2015 | Gambeski .............. B64D 47/02 315/112 |
| 9,497,820 | B2 * | 11/2016 | Gambeski .............. B64D 47/02 |

* cited by examiner

*Primary Examiner* — Haissa Philogene
(74) *Attorney, Agent, or Firm* — Drinker Biddle & Reath LLP

(57) ABSTRACT

An LED lighting assembly onboard an aircraft includes at least one light emitting diode (LED) unit and a controller. The LED unit includes any number of primary LEDs and at least two white LEDs. The controller is configured to supply respective driving signals to each of the LEDs, the respective driving signals individually controlling relative intensity outputs of the respective LEDs. The controller is further configured to display a desired color point by continuously driving the white LEDs while not driving at least one of the other LEDs.

10 Claims, 10 Drawing Sheets

US 9,868,390 B1

LED LIGHTING ASSEMBLY USING A DYNAMIC COLOR MIXING SCHEME

FIELD OF THE DISCLOSURE

The present disclosure relates generally to color mixing via light emitting diodes (LEDs), and more specifically to an LED lighting assembly using the dynamic color mixing scheme.

BACKGROUND

Color mixing schemes are used to provide lighting accents generally via indirect lighting (i.e., an area is illuminated primarily by light from the illumination source that is reflected off of another surface). Various moods may be created, particularly when colored lighting is used.

Advances in light emitting diode (LED) technology has made LEDs an ideal source of light where low-powered lighting solutions are desirable, such as in an aircraft, where power availability is limited.

BRIEF DESCRIPTION OF THE DRAWINGS

While the appended claims set forth the features of the present techniques with particularity, these techniques may be best understood from the following detailed description taken in conjunction with the accompanying drawings of which:

DETAILED DESCRIPTION

The following discussion is directed to various embodiments. However, one possessing ordinary skill in the art will understand that the examples disclosed herein have broad application, and that the discussion of any embodiments is meant only be an example of that embodiment, and not intended to suggest that the scope of the disclosure, including claims, is limited to that embodiment.

Certain terms are used throughout the following description to refer to particular features or components. As one skilled in the art will appreciate, different persons may refer to the same feature or component by different names.

An improved LED lighting assembly is disclosed herein. According to an embodiment, an LED lighting assembly adds additional LEDs with additional colors (e.g., orange, amber, etc.) to increase the size of the gamut, thus creating multiple solutions for each color point. The various solutions for each color point may be used to create different lighting schemes that vary with, for instance, time of day, a particular activity such as boarding the aircraft or serving food, or the like.

In an example embodiment, an LED lighting assembly includes at least a first LED of a first color, a second LED of a second color, a third LED of a third color, and a fourth LED and a fifth LED each having a white color. The LED lighting assembly further includes a controller configured to supply respective driving signals to each of the first, second, third, fourth, and fifth LEDs. The respective driving signals individually control relative intensity outputs of the various LEDs. The controller is further configured to display a desired color point by driving the fourth and the fifth LEDs and two of the first, second, or third LEDs while not driving the other one of the first, second, or third LEDs.

Figure 1:
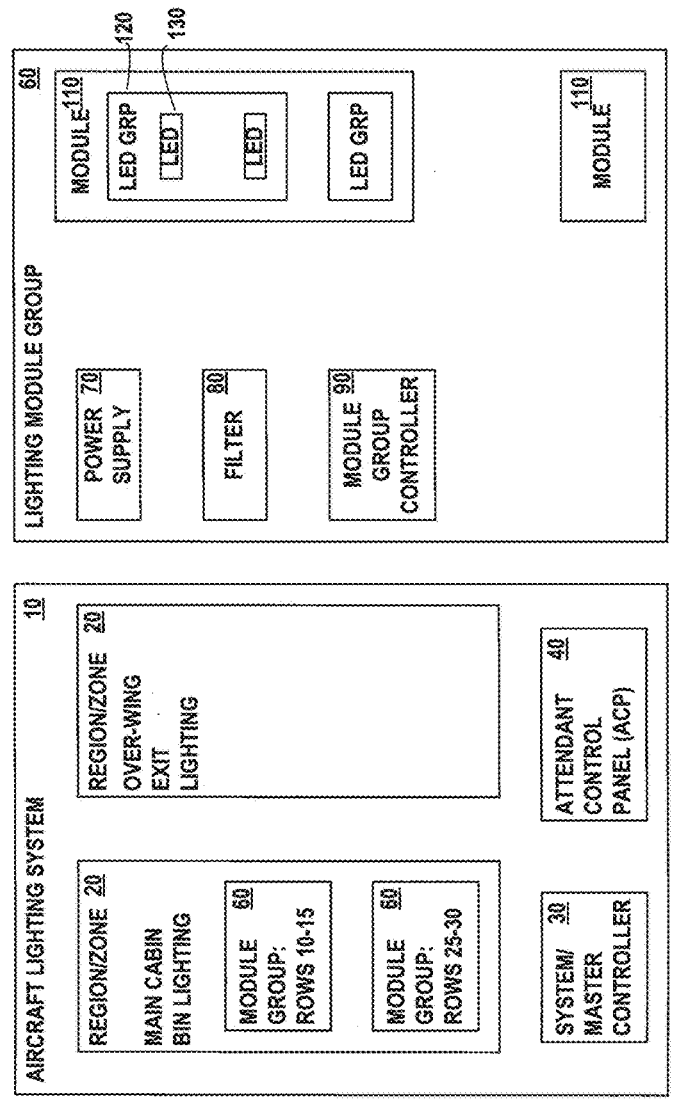
FIG. 1A is a block diagram illustrating a configuration of lighting system components, according to an embodiment.
FIG. 1B is a block diagram illustrating the primary components of a lighting module group, according to an embodiment.

FIG. 1 provides an example organization of a grouping hierarchy that may be used in the aircraft lighting system 10. The lighting system may be broken down into different addressable lighting regions 20 that could be used on an aircraft. For example, the regions on an aircraft could include: sidewall lighting, cross-bin lighting, over wing exit lighting, ceiling lighting, direct lighting, etc. The regional breakdown of the lighting system allows lighting control over broad areas of the aircraft.

Within each of these regions 20, one or more lighting module groups 60 may be provided. These module groups 60 may be fashioned as line replaceable units (LRUs) to enable quick assembly, maintenance, and replacement. For example, one module group 60 could be for the main cabin cross-bin lighting for rows 10-15.

The aircraft lighting system 10 further comprises a system controller 30 that can use, e.g., an attendant control panel (ACP) 40 as the primary user interface for attendants controlling the lighting during a flight (including on-ground parts of a flight), as well as for maintenance.

The LED modules in the system may be designed to be interconnected with one another into module groups. The lighting module groups 60 each comprise a power supply 70 that converts the aircraft power into a power usable by the module group 80, and may comprise a filter 80 for filtering out harmful noise and other signals. Each module group comprises a module group controller 90 that can intelligently handle high-level instructions from the system controller 30 and possibly provide useful information back to the system controller 30.

The lighting module group 60 may comprise one or more lighting modules 110 that each, in turn, comprises a plurality of LEDs 130 that may be organized in LED groups 120. Note that an individual LED 130 could belong to more than one group 120. For example, an LED 130 could be arranged according to one group based on the manufacturer, and could be arranged in another group based on its color.

Note that when the lighting module group 60 comprises a single lighting module 110, the characteristics (such as power supply 70, filter 80, and controller 90) can be associated with the module 110 itself. In other words, the lighting module group 60 and lighting module 110 could be construed as the same thing when there is only a single module 110 in the group 60.

Each module 110 can be designed to comprise one or more of the following: a) control circuitry 90 for controlling the module and possibly other attached slave modules 110' in a group 60; b) power supply circuitry 70 to enable an LED washlight to function off of, e.g., a 115 VAC, 400 HZ power source; and c) filtering circuitry 80 to filter incoming power to the modules and ensure that no problematic harmonic emissions, spikes or other undesirable power conditions are introduced back onto the aircraft power bus.

The LEDs 130 within a module can possibly be controlled individually, within specific groupings of LEDs 120 within a module, or collectively (all LEDs in a module). The groupings 120 can comprise arbitrary numbers of LEDs, or can be grouped according to area zones, color, LED characteristics, or other schemes.

In order for a lighting module 110 to produce specific desired color set points (which includes both color and intensity or luminous flux), multiple LEDs 130 of different types are used in combination such that their mixed light outputs produce the specific desired colors and the desired overall luminous flux. For example, a lighting module 110 may include LEDs 130 that produce colors in each of three primary colors red, green, blue, and white.

Figure 2:
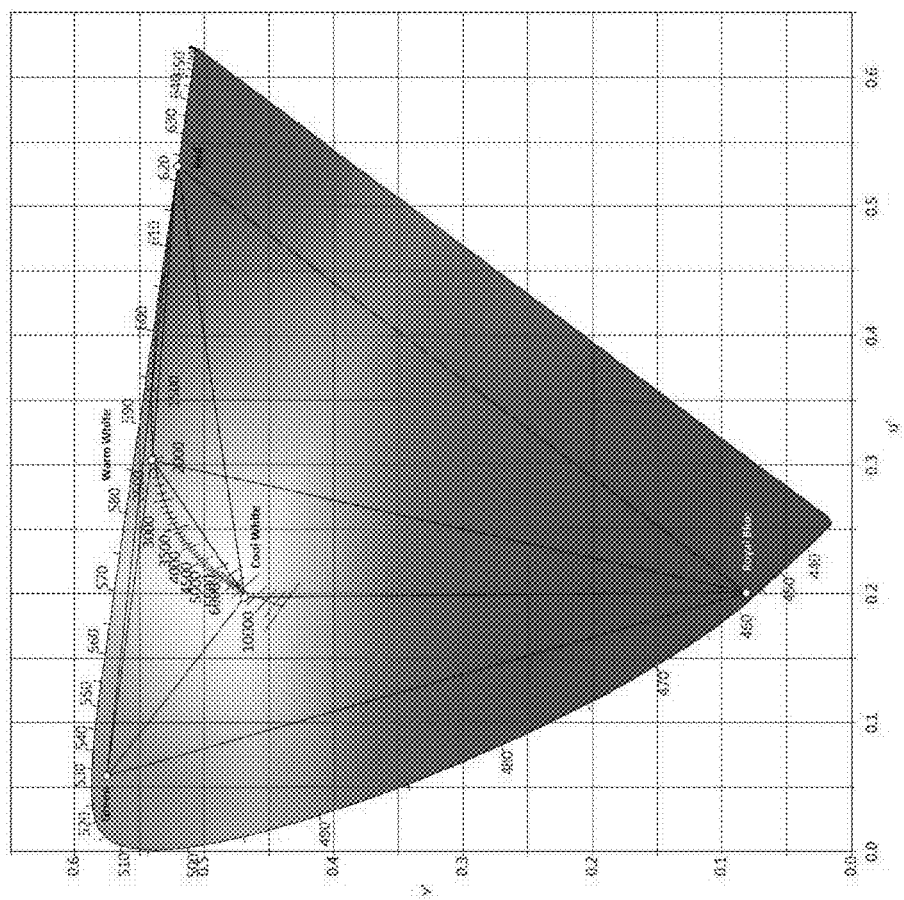
FIG. 2 illustrates a CIE 1931 chromaticity diagram according to an embodiment.

FIG. 2 illustrates a CIE 1931 chromaticity diagram in accordance with one embodiment. In a lighting module 110 that includes red, green, blue, cool white, and amber white LEDs, a specific desired color set point on the chromaticity diagram may be realized by mixing different intensities of each of the red, green, blue, cool white and amber white LED light outputs together.

Figure 3:
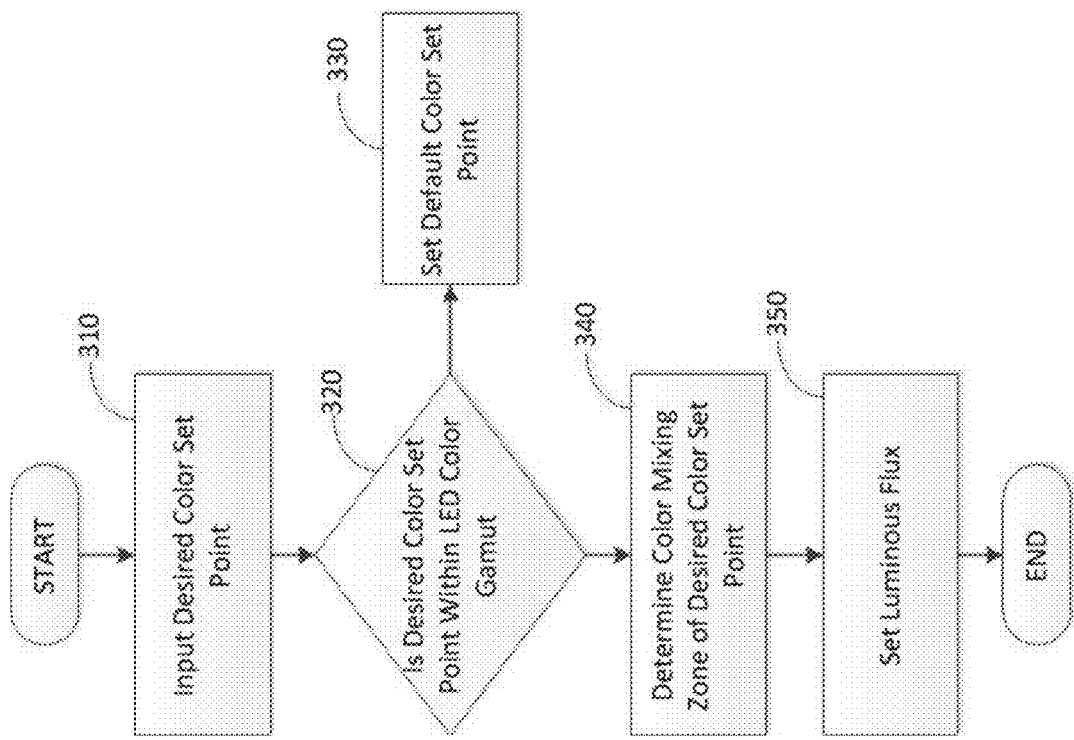
FIG. 3 illustrates a method of mixing the light output from multiple LEDs of different colors to produce a desired color set point, according to an embodiment.

FIG. 3 illustrates a method of mixing the light output from multiple LEDs 130 of different colors to produce a desired color set point. The method of FIG. 3 may be performed by the controller within the LED lighting module 110 and be employed during operation of the lighting module 110. In additional embodiments, the method may be performed by a controller within the module group controller 90, or other location which controls the LEDs 130 of the LED lighting module 110.

In a step 310, a desired color set point on the CIE 1931 chromaticity diagram ($x_d$, $y_d$) for the LED lighting module 110 is input. In a step 320, a determination is made as to whether the desired color set point ($x_d$, $y_d$) is within the color gamut of the LEDs 130 of the LED lighting module 110. If the desired color set point ($x_d$, $y_d$) is determined to not be within the color gamut of the LEDs 130 of the LED lighting module 110, in step 330, a default light output mixture of the multiple LEDs 130 may be set, such as all on at 25% power, 50% power, 75% power, 90% power, or 100% power. Alternatively, during operation of the LED lighting module 110, in step 330, a color reasonably close or closest to the desired color set point which is within the color gamut of the LEDs 130 may be chosen, and the method may continue to step 340.

In a step 340, which one or more color mixing zones defined by the plurality of different color LEDs 130 of the LED lighting module 110 within which the desired color set point lies is determined. The method for determining the one or more color mixing zones in accordance with step 340 according to one embodiment will be described in more detail with reference to FIGS. 4-9.

Figure 4:
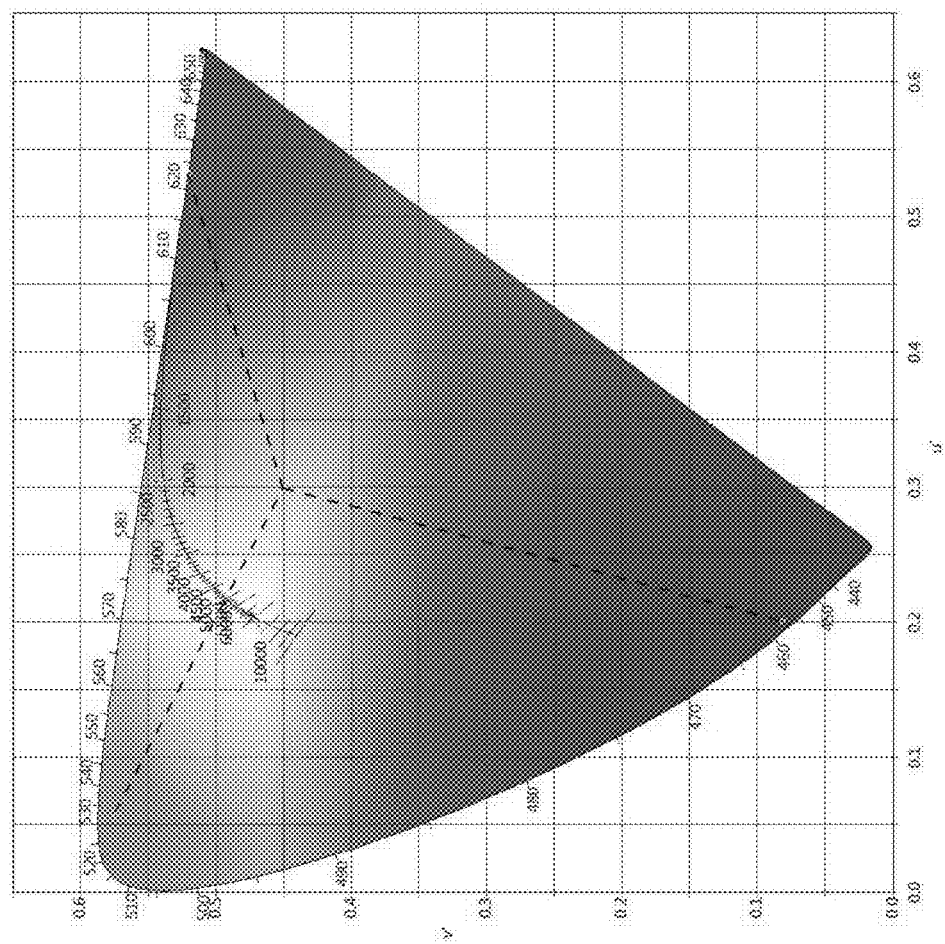
FIG. 4 illustrates a CIE 1931 chromaticity diagram depicting a first step of the method of mixing colors according to an embodiment.
Figure 5:
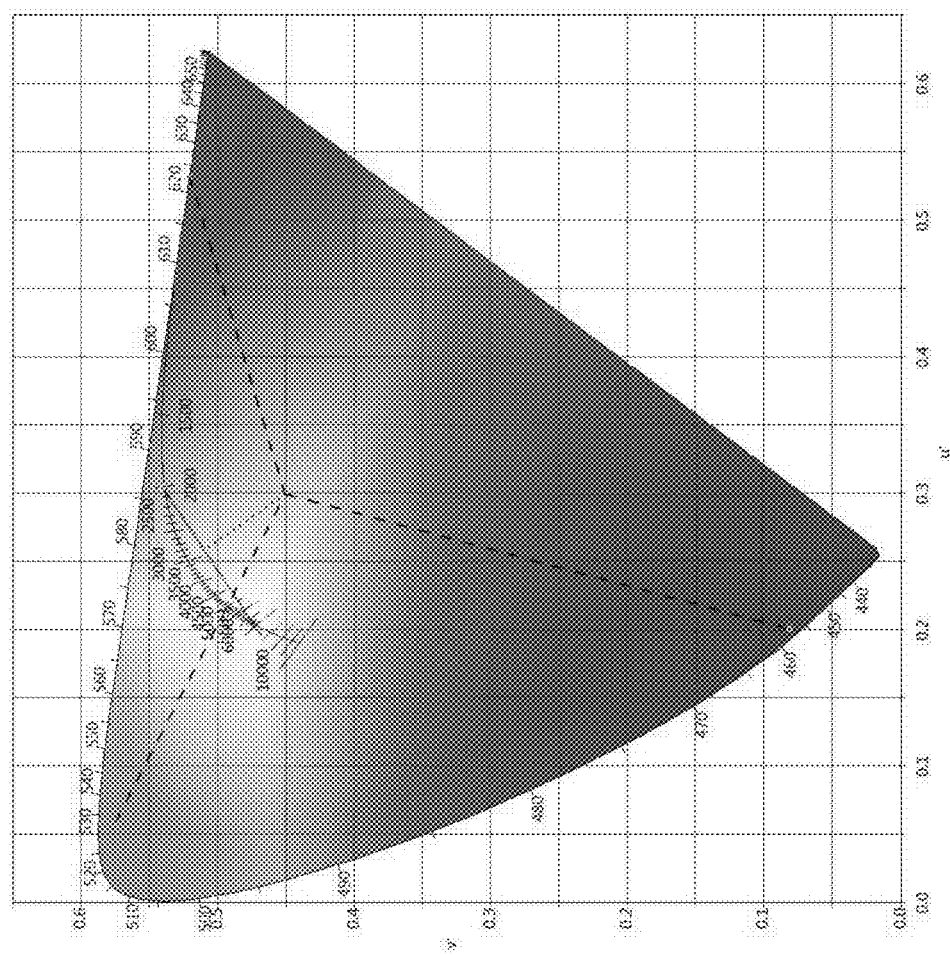
FIG. 5 illustrates a CIE 1931 chromaticity diagram depicting a second step of the method of mixing colors according to an embodiment.

Turning to FIG. 4, a CIE 1931 chromaticity diagram is illustrated with the three primaries (Red, Green, and Blue) forming the triangle. The controller creates ratio-metric mix of the primaries for the desired color point. This point may be referred to as $D_{RGB}$. Next, in FIG. 5, the CIE 1931 chromaticity diagram of FIG. 2 including the two additional white LEDs (cool white and warm white) is illustrated. According to the embodiment, the controller determines the intersect point from the desired color point ($D_{RGB}$) to the gamut formed by the two whites (WW line). In an embodiment, the shortest distance from $D_{RGB}$ to the WW line is used by the controller to determine the intersect point. In an embodiment, the controller may bias the intersect point by a predetermined amount (e.g., 10%) towards the warm white than the shortest distance to improve the CRI of the resulting mix. According to some embodiments, the controller biases the intersect point to ensure that it does not coincide with one of the white points. This ensures that both white LEDs are on at all times, thereby increasing the overall efficiency and CRI of the color mixing system.

Figure 6:
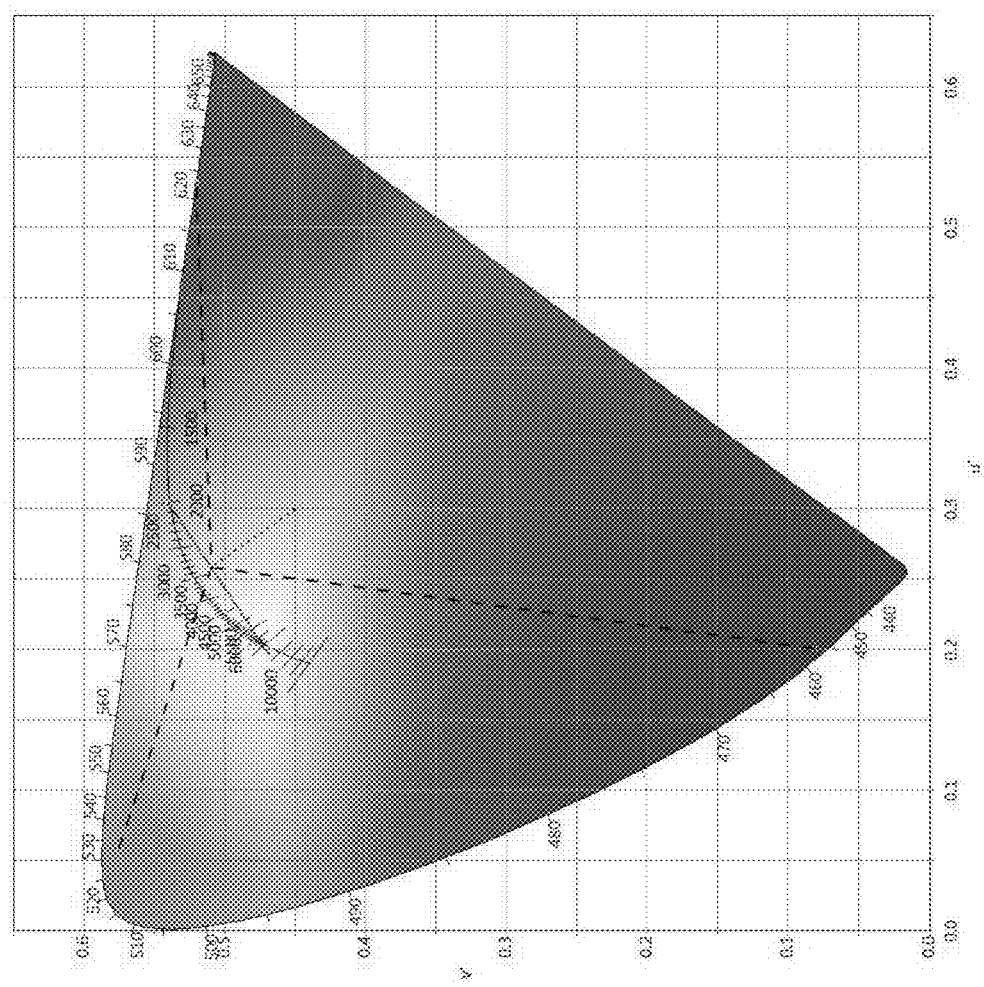
FIG. 6 illustrates a CIE 1931 chromaticity diagram depicting a third step of the method of mixing colors according to an embodiment.
Figure 7:
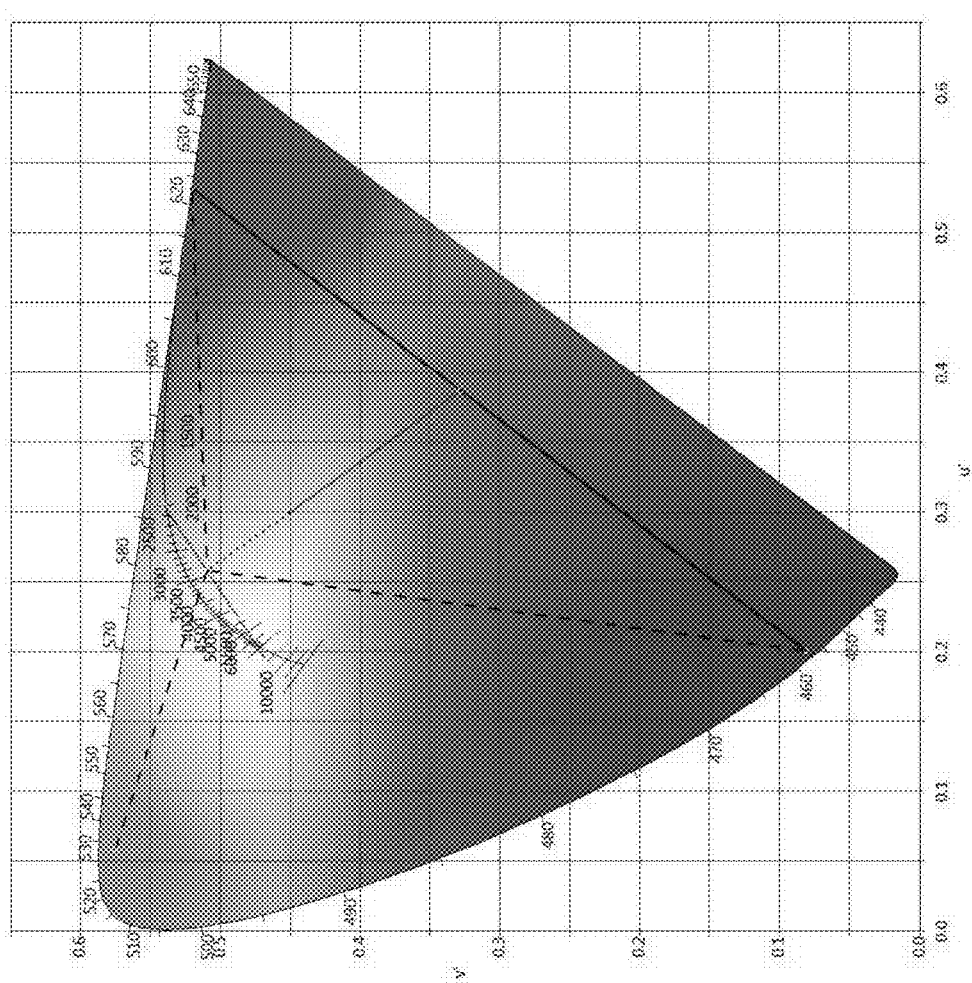
FIG. 7 illustrates a CIE 1931 chromaticity diagram depicting a fourth step of the method of mixing colors according to an embodiment.
Figure 8:
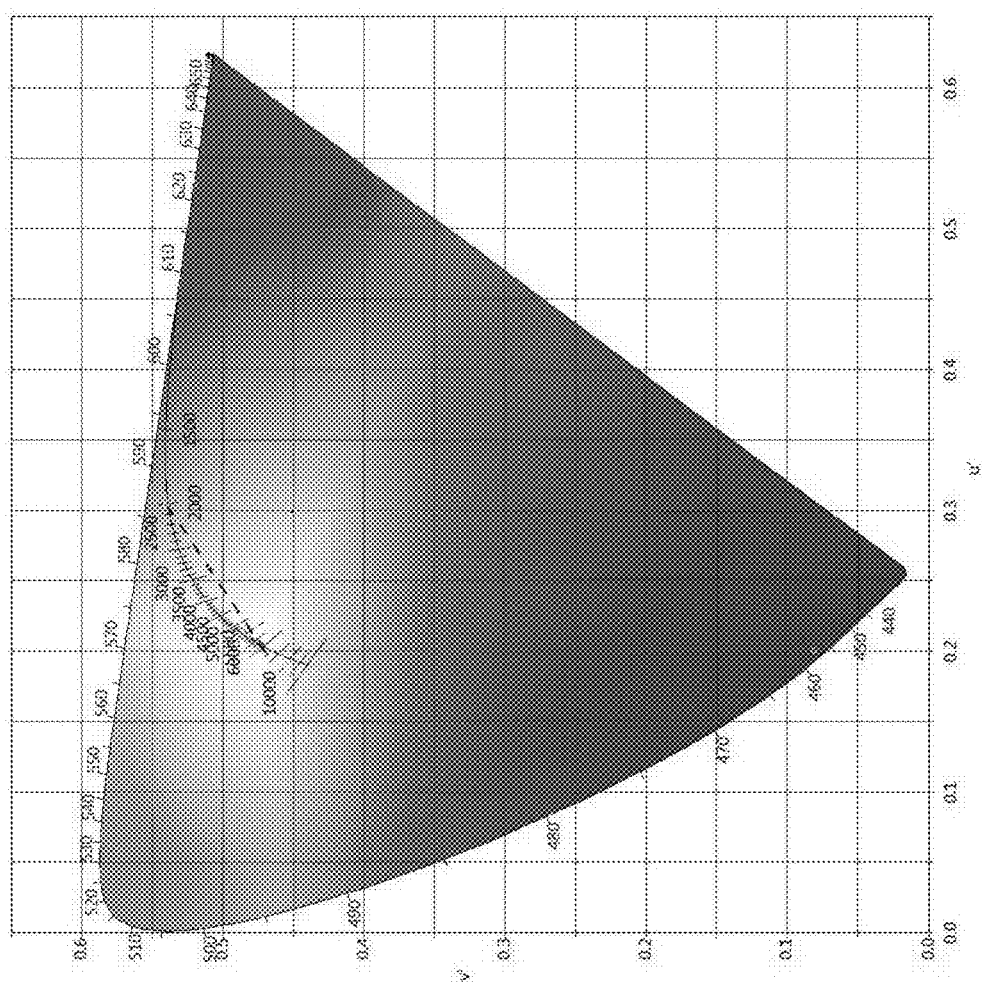
FIG. 8 illustrates a CIE 1931 chromaticity diagram depicting a fifth step of the method of mixing colors according to an embodiment.
Figure 9:
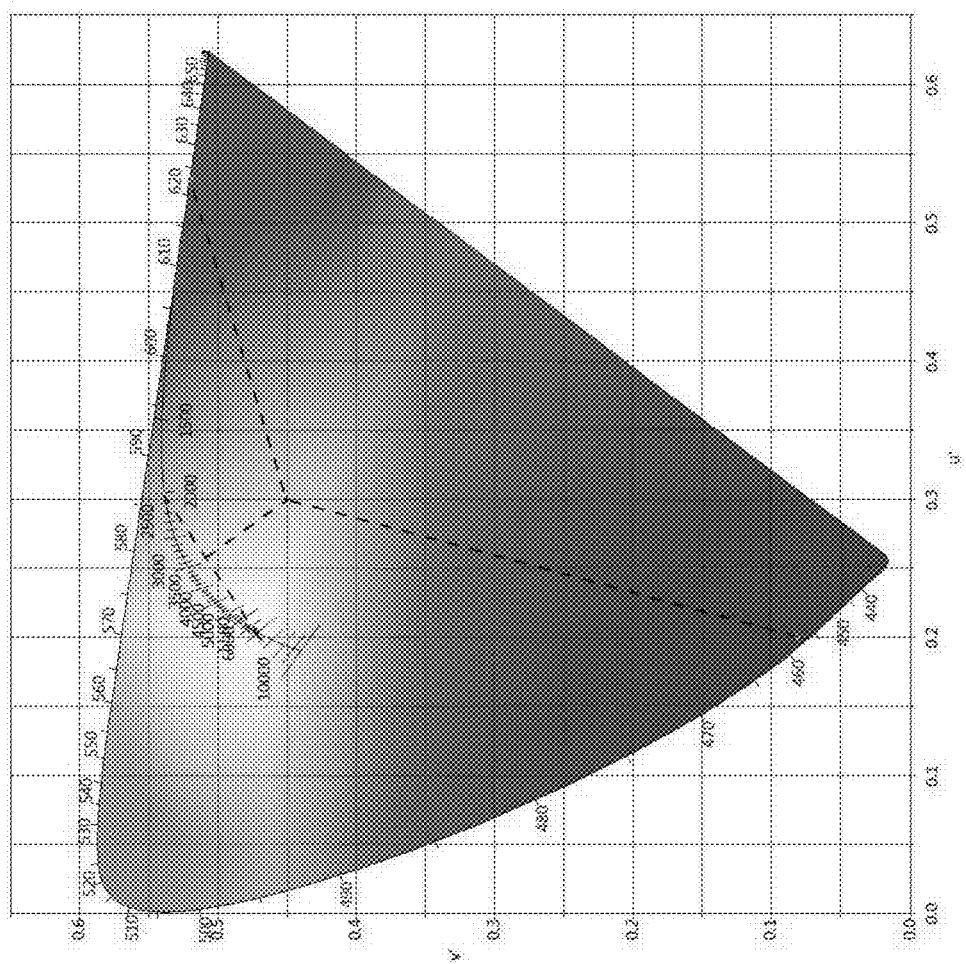
FIG. 9 illustrates a CIE 1931 chromaticity diagram depicting a sixth step of the method of mixing colors according to an embodiment.

Next, as illustrated in FIG. 6, a ratio-metric mix of primaries (RGB) for the intersection point with the while line is created by the controller. This point may be referred to as $W_{RGB}$. The processor then subtracts $W_{RGB}$ from $D_{RGB}$ until one of the primaries of $D_{RGB}$ goes to zero. As shown in FIG. 7, this "pushes" the color point away from $W_{RGB}$ until one of the colored LEDs is removed (Green in this instance). The resulting point may be referred to as Sat-$D_{RGB}$. Next, the processor creates a mix of the warm white and cool white LEDs to produce a metameric equivalent of the color point $W_{RGB}$ as show in FIG. 8. This color point may be referred to as $W_{WW}$. Finally, according to the embodiment, the controller adds the same proportion of $W_{WW}$ that was removed previously (as shown in FIG. 7) to the $D_{RGB}$ color mix. As illustrated in FIG. 9, this "pulls" the color point back toward $W_{RGB}$. The resulting color point is a metameric equivalent of the $D_{RGB}$, with the white mix substituting for one of the colored LEDs (Green in this instance).

Figure 10:
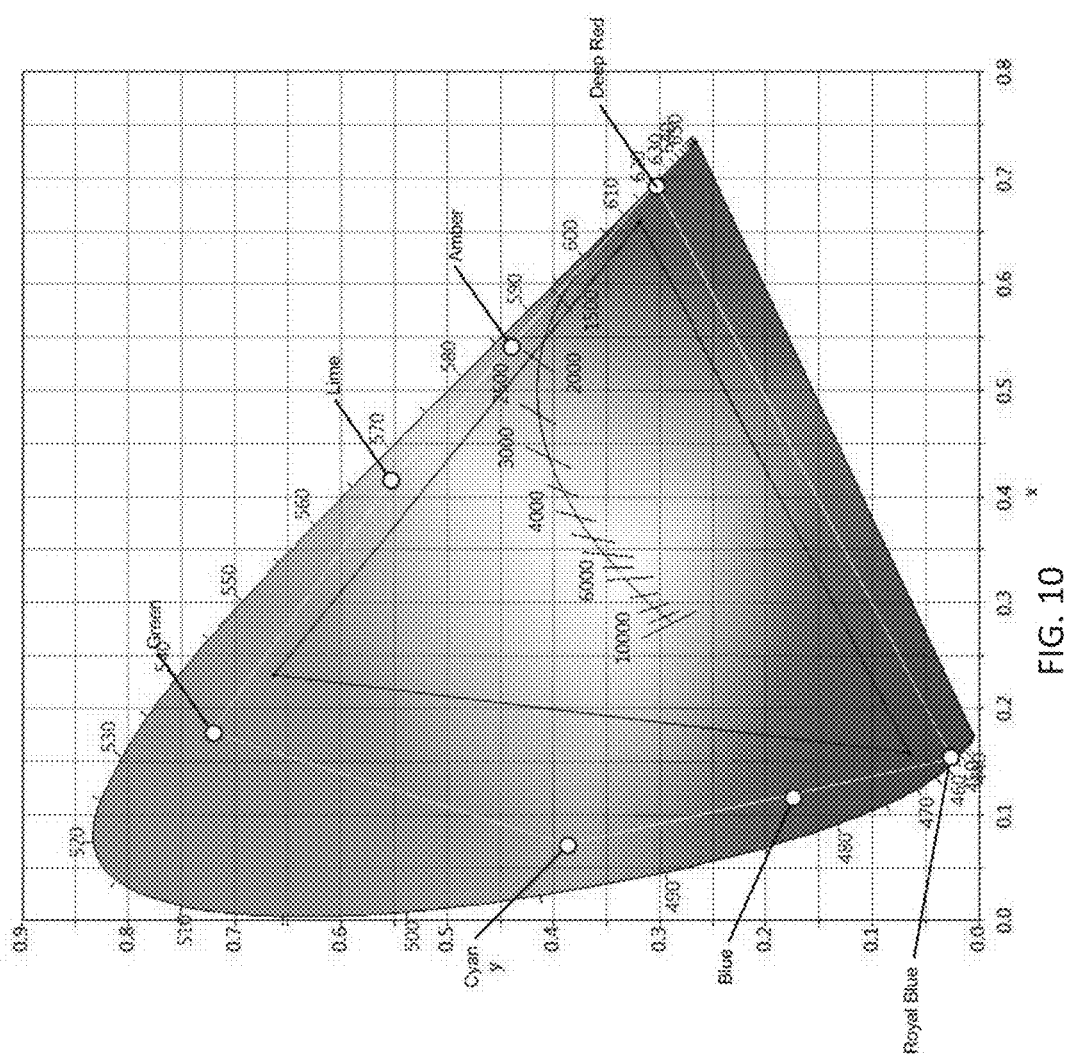
FIG. 10 illustrates a CIE 1931 chromaticity diagram having multiple colored LEDs according to an embodiment.

A person skilled in the art will appreciate that the controller may substitute the white mix for any of the colored LEDs based on the desired color mix. For instance, as illustrated in FIG. 10, the controller may drive the LEDs to obtain a lime color or an amber color by driving the royal blue content to null and replacing it with the white mix or obtain a cyan color by driving the deep red content to null. In various embodiments, the controller may obtain the metameric equivalents for the same color (for example, creating a warmer white which makes food appear more appetizing or creating a brilliant white with increased royal blue content which may make objects appear brighter) and appropriately drive the LEDs based on the desired needs.

Returning to FIG. 3, once the controller determines the appropriate color mix ratios in step 340, in a step 350, the luminous flux ratios of each of the LEDs 130 in the LED lighting module 110 are set according to the determined color mixing zone to produce the desired color set point. For example, if the desired set point is determined in step 340 to not contain any red color content, the luminous flux ratio of the red (R) LEDs 130 would be set to substantially zero, and the luminous flux ratios of each of the green (G), blue (B), cool white and warm white (W) LEDs 130 would be set appropriately to mix to produce the desired color set point on the chromaticity diagram.

According to various embodiments, the LED lighting assembly described above may create various moods using the multiple solutions generated for each color point. For instance, it may be preferable to obtain a cooler orange during sunset, or to obtain a warmer orange during sunrise.

In an embodiment, the controller includes a user interface such as the ACP 40. The controller may be configured to receive an input indicating a desired color point (e.g. white) via the ACP 40. The controller may additionally be configured to receive an indication of a mood associated with the desired color point via the ACP 40. For instance, a warmer white may be desired when serving food to make the food appear more appetizing, while a brilliant white may be desired at boarding to give a brighter look to the cabin. In another embodiment, the ACP 40 may be configured to receive an indication associated with an event (e.g., food, boarding, de-boarding, sunrise, sunset, etc.) and determine the desired color point based on the selected event.

The LED lighting assembly, upon receiving the desired color point and mood associated with the desired color point, drives the LEDs according to the color mixing scheme described above with reference to FIGS. 4-9. Accordingly, in an embodiment, when a brilliant white is selected via the user interface, the controller drives the various LEDs to obtain a white color with increased royal blue content, whereas when a warmer white is desired, the controller drives the various LEDs to obtain a metameric equivalent of the white color that includes increased deep red content. In an embodiment, the controller may have predetermined desired color points stored therein that are associated with specific events or time of day.

A person skilled in the art will further understand that the embodiment described with reference to FIGS. 4-9 is not limited to using RGB primaries, and that any number of colored LEDs may be used to obtain the desired color gamut. According to an embodiment, the above color mixing method may be repeated for each additional color over three for as many colors as desired. In an embodiment, the controller accounts for the changes in luminous flux of the LEDs based on the age of the respective LEDs and adjust the color mixing ratios appropriately. For instance, in an embodiment, the primary LEDs consist of an Amber LED, a Cyan LED, a Magenta LED, and an Orange LED. A person skilled in the art will appreciate that additional color LEDs may be provided as part of the primary LEDs.

Similarly, one embodiment has been described above as having a cool white LED and an amber white LED. A person skilled in the art will understand that additional variations of white LEDs may be used instead without deviating from the scope of the disclosure. As discussed above, the ability to provide additional LEDs as part of the primary LEDs and driving the white LEDs to be constantly on results in a high resolution dimming (i.e., no perceivable steps) and CRI levels at approximately 99. In addition, the ability to use multiple LEDs provides the largest color gamut outputting any saturated color mix as well as high quality secondary colors such as cyan, pink, etc.

Although the above has been described for use as lighting within an aircraft, the LED lighting assembly described is not limited and can apply to other applications as well. The term "aircraft" as used herein is to be understood as a proxy for any passenger vehicle or any illuminated area. Similarly, the term LED or light-emitting diode is to be understood as a proxy for any illumination source that can be controllable in a manner similar to that described herein. For instance, illumination sources such as lasers etc. may be used in place of the LEDs described above.

The system or systems may be implemented on any general purpose computer or computers and the components may be implemented as dedicated applications or in client-server architectures, including a web-based architecture. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the LED lighting assembly described, reference has been made to the preferred embodiments illustrated in the drawings, and specific language has been used to describe these embodiments. However, no limitation of the scope of the described embodiments is intended by this specific language, and the LED lighting assembly should be construed to encompass all embodiments that would normally occur to one of ordinary skill in the art.

The example embodiments discussed above may be described in terms of functional block components and various processing steps. Such functional blocks may be realized by any number of hardware and/or software components configured to perform the specified functions. For example, the LED lighting assembly may employ various integrated circuit components, e.g., memory elements, processing elements, logic elements, and the like, which may carry out a variety of functions under the control of one or more microprocessors or other control devices. Similarly, where the elements of the described LED lighting assembly are implemented using software programming or software elements the LED lighting assembly may be implemented with any programming or scripting language such as C, C++, Java, assembler, or the like, with the various algorithms being implemented with any combination of data structures, objects, processes, routines or other programming elements. Furthermore, any number of conventional techniques for electronics configuration, signal processing and/or control, data processing and the like may be employed. The word mechanism is used broadly and is not limited to mechanical or physical embodiments, but can include software routines in conjunction with processors, etc.

The particular implementations shown and described herein are illustrative examples of the LED lighting assembly and are not intended to otherwise limit the scope in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice unless the element is specifically described as "essential" or "critical".

The use of the terms "a" and "an" and "the" and similar referents in the context of describing the LED lighting assembly (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present disclosure.

What is claimed is:

1. An LED lighting assembly comprising:
a plurality of primary LEDs each outputting a respective color;
at least two additional LEDs each outputting a white color;
a controller configured to supply respective driving signals to each of the plurality of primary LEDs and the two white LEDs, the respective driving signals individually controlling relative intensity outputs of the respective primary LEDs and the two white LEDs,
wherein the controller is further configured to display a desired color point by:
continuously driving the two white LEDs while not driving at least one of the plurality of primary LEDs,
determining a ratiometric mix of the output of the primary LEDs to match the desired color point;
determining a ratiometric mix of the output of the two white LEDs to obtain a white mix; and
determining a metameric equivalent of the desired color point by substituting the output of one of the primary LEDs with the white mix.

2. The LED lighting assembly according to claim 1, wherein the controller is configured to:
calibrate the LEDs to maintain color consistency over time and changes in temperature.

3. The LED lighting assembly according to claim 1, wherein substituting one of the primary LEDs with the white mix comprises:
determining a ratiometric mix of the output of the primary LEDs to match a color point of the white LEDs;
subtracting the matched color point of the white LEDs from the desired color point until the output of one of the primary LEDs approaches zero; and
adding an identical proportion of the white mix to the desired color point that was subtracted from the desired color point.

4. The LED lighting assembly according to claim 1, wherein the two white LEDs are always on.

5. A method of controlling lighting within an aircraft, comprising:
receiving a desired color selection via a user interface aboard the aircraft, the desired color selection including an indication of an event associated with a desired color point;
driving a plurality of LEDs via a controller to generate a plurality of metameric equivalents of the desired color point; and
selecting one of the generated plurality of metameric equivalents of the desired color point based on the indicated event associated with the desired color point.

6. The method according to claim 5, wherein the controller is configured to drive:
a plurality of primary LEDs each outputting a respective color, and
at least two additional LEDs each outputting a white color.

7. The method according to claim 6, wherein the controller is configured to:
calibrate the LEDs to maintain color consistency over time and changes in temperature.

8. The method according to claim 6, wherein generating a plurality of metameric equivalents of the desired color point comprises:
determining a ratiometric mix of the output of primary LEDs to match the desired color point;
determining a ratiometric mix of the output of the white LEDs to obtain a white mix; and
determining a metameric equivalent of the desired color point by substituting the output of one of the primary LEDs with the white mix.

9. The method according to claim 8, wherein substituting the output of one of the primary LEDs with the white mix comprises:
determining a ratiometric mix of the output of the primary LEDs to match a color point of the white LEDs;
subtracting the matched color point of the white LEDs from the desired color point until the output of one of the primary LEDs approaches zero; and
adding an identical proportion of the white mix to the desired color point that was subtracted from the desired color point.

10. The method according to claim 6, wherein the white LEDs are always on.

* * * * *